US007568218B2

(12) United States Patent
Garg et al.

(10) Patent No.: US 7,568,218 B2
(45) Date of Patent: Jul. 28, 2009

(54) SELECTIVE CROSS-REALM AUTHENTICATION

(75) Inventors: Praerit Garg, Kirkland, WA (US); Cliff Van Dyke, Bellevue, WA (US); Karthik Jaganathan, Kirkland, WA (US); Mark Pustilnik, Newcastle, WA (US); Donald E. Schmidt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 630 days.

(21) Appl. No.: 10/285,175

(22) Filed: Oct. 31, 2002

(65) Prior Publication Data

US 2004/0088543 A1 May 6, 2004

(51) Int. Cl.
*H04L 9/32* (2006.01)
(52) U.S. Cl. .................. 726/4; 726/2; 726/3; 726/6; 726/26; 726/27; 713/182; 713/183; 713/185
(58) Field of Classification Search .................. 726/1–6, 726/9–10, 26–27; 713/182, 185, 168; 709/224–225; 707/9
See application file for complete search history.

(56) References Cited

U.S. PATENT DOCUMENTS

| | | | | |
|---|---|---|---|---|
| 5,204,961 A | * | 4/1993 | Barlow | ............ 726/1 |
| 6,105,027 A | * | 8/2000 | Schneider et al. | ............ 707/9 |
| 6,205,480 B1 | * | 3/2001 | Broadhurst et al. | ......... 709/225 |
| 6,308,273 B1 | * | 10/2001 | Goertzel et al. | ............ 726/9 |
| 6,339,423 B1 | * | 1/2002 | Sampson et al. | ........... 715/854 |
| 6,640,302 B1 | * | 10/2003 | Subramaniam et al. | ..... 713/169 |
| 6,892,309 B2 | * | 5/2005 | Richmond et al. | ............ 726/7 |
| 6,954,792 B2 | * | 10/2005 | Kang et al. | ............ 709/229 |
| 6,993,596 B2 | * | 1/2006 | Hinton et al. | ............ 709/250 |
| 7,010,600 B1 | * | 3/2006 | Prasad et al. | ............ 709/225 |
| 7,185,364 B2 | * | 2/2007 | Knouse et al. | ............ 726/8 |
| 2002/0112155 A1 | * | 8/2002 | Martherus et al. | .......... 713/155 |
| 2003/0023880 A1 | * | 1/2003 | Edwards et al. | ............ 713/201 |
| 2003/0093666 A1 | * | 5/2003 | Millen et al. | ............ 713/157 |
| 2003/0177388 A1 | * | 9/2003 | Botz et al. | ............ 713/201 |
| 2007/0289006 A1 | * | 12/2007 | Ramachandran et al. | ...... 726/10 |

* cited by examiner

*Primary Examiner*—Edan Orgad
*Assistant Examiner*—Yin-Chen Shaw
(74) *Attorney, Agent, or Firm*—Lee & Hayes, PLLC

(57) ABSTRACT

A selective cross-realm authenticator associates an identifier with a request from an entity authenticated in one realm to access a resource associated with a second realm. The identifier indicates that the entity was authenticated in a realm other than the realm associated with the requested resource. A domain controller associated with the resource performs an access check to verify that the authenticated user is authorized to authenticate to the requested resource. Permissions associated with the resource can be used to specify levels of access to be granted to entities authenticated by a domain controller associated with another realm.

6 Claims, 4 Drawing Sheets

SELECTIVE CROSS-REALM AUTHENTICATION

TECHNICAL FIELD

This invention relates to computer-based resource security and, in particular, to systems and methods for supporting selective cross-realm authentication.

BACKGROUND

A domain controller is a server computer system that maintains user accounts associated with one or more client computer systems. The domain controller, together with the client computer systems associated with it, is known as a domain. A domain may also have multiple domain controllers. When a user has an account on a domain controller, the user can log on to any client computer system within the domain, and the user account is authenticated through the domain controller.

To reduce the need for maintaining duplicate user accounts throughout an organization (e.g., when a user is authorized to access client computer systems in multiple domains), a trust may be established between two or more domains. In this scenario, a user, when authenticated by a first domain, can access a client computer system associated with a second domain provided that a trust exists between the first and second domain. A group of mutually trusted domains is known as a "forest". For example, a company may have a forest of domains, where each domain is associated with a particular group or organization (e.g., legal, human resources, accounting, etc.) within the company. Based on mutual trust between the domains of the forest, a user within the company can potentially log on to any client computer system within the company.

For the purposes of this discussion we refer to both Forests and domains as 'realms'. Note that even though the following descriptions refer to forests the concepts apply to other types of realms and collections of realms as well. The term domain controller refers to an instance of the realm. Many such domain controllers may be present in a realm. Situations exist in which one entity (e.g., company or organization) wants to grant access to computer resources within its forest to users from another entity. To accomplish this, a trust is established between a forest associated with the first entity and a forest associated with a second entity.

Users are granted access to a resource based on one or more sets of permissions associated with the resource and the user. Typically, a default set of permissions is granted to all users who are authenticated to access a particular resource. The default set of permissions provide an access level that is considered appropriate for any user that can authenticate to the resource. Within a single domain or resource, the default set of permissions that are granted to all users are typically those permissions that are appropriate for all members of the entity represented by the forest. However, when a trust is established between two forests, users from one forest may be allowed to authenticate to a resource in another forest, but the default access permissions that apply to all users of the resource may not be appropriate for a user that authenticates from a different forest. For example, it may be appropriate for users that authenticate within a single forest to have read access to a particular file resource, while it may not be appropriate for users that authenticate from a different forest to have any access to the particular file resource. This might be happen when the two forests are associated with different corporations or organizations. In other cases such as when the two forests are in the same organization it might make sense to have the same access permissions for users authenticated in either forest.

As such, it is important to be able to distinguish between access requests originating from users authenticated by a domain controller in a forest whose users can have the same set of permissions as users authenticated by a domain controller in the local forest versus requests originating from users authenticated by a domain controller in a forest whose users should not have the same set of permissions as users authenticated by a domain controller in the local forest. Other criteria may also be used to determine the type of request, such as whether the request originated from a realm associated with the same organization with which the requested resource is associated, or whether the request originated from one of a subset of users in the realm who are allowed to submit such a request.

SUMMARY

A selective cross-realm authenticator is described. The selective cross-realm authenticator identifies requests from authenticated users in one realm to access resources associated with a second realm. The selective cross-realm authenticator then associates an indicator with the request according to a realm in which the request authenticated or other data associated with authentication of the requesting user. Authentication and resource access decisions may then be made based on the indicator associated with the request. Access permissions associated with a resource may also be based on the indicator.

BRIEF DESCRIPTION OF THE DRAWINGS

The same numbers are used throughout the drawings to reference like features and components.

DETAILED DESCRIPTION

The following discussion is directed to selective cross-realm authentication within an environment that includes multiple groups of domain controllers. Throughout the following discussion, a realm is defined as any group of resources, such as a domain (which includes one or more domain controllers and the associated computer systems) or a forest (which includes a group of mutually trusted domains). A selective cross-realm authenticator provides a mechanism for indicating that a user requesting access to a resource in a particular realm was authenticated by a domain controller in another realm. The selective cross-realm authenticator also classifies and/or flags the request according to a level of trust that is defined between the two realms. Based on the classification a domain controller associated with the realm to which a user is requesting access verifies that users authenticated from another realm are authorized to access the requested resource. Furthermore, each resource may maintain, at an object level, access permissions that specify levels of access that are allowed to users, such that the permissions granted for users authenticated by a domain controller in the same realm as the resource may be different than the permissions granted for users authenticated by a domain controller associated with another realm. The term "user" or "authenticated user" as used in this discussion refers to any entity that may be authenticated by a domain controller. This may include, but is not limited to, individual users, user groups, applications, and computer systems.

Exemplary Environment

Figure 1:
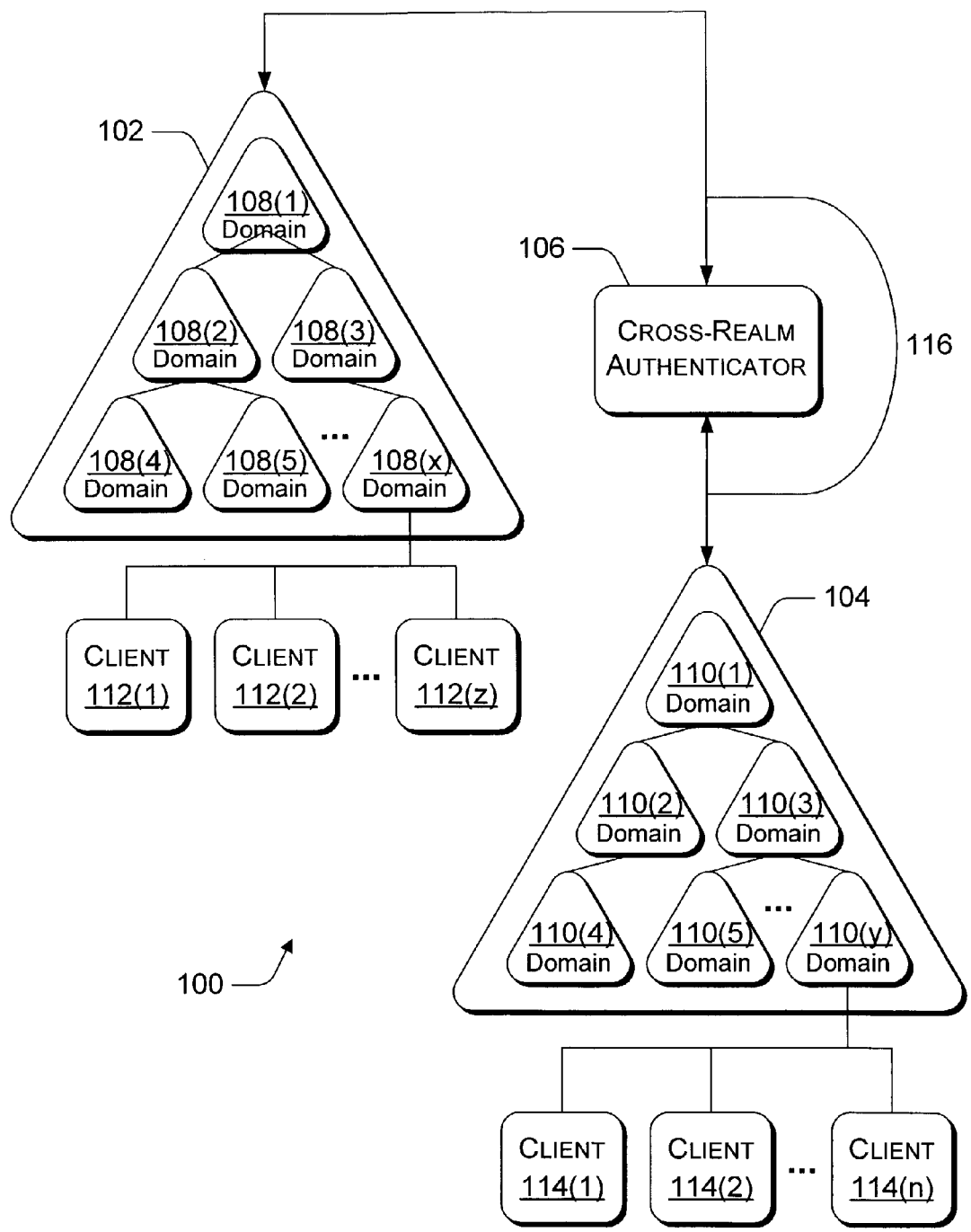
FIG. 1 illustrates an exemplary environment in which selective cross-realm authentication may be implemented.

FIG. 1 illustrates an exemplary environment in which selective cross-realm authentication may be implemented. Environment 100 includes a realm 102, a realm 104, and a cross-realm authenticator 106. In the illustrated example, realm 102 is a forest made up of a group of domains 108, and similarly, realm 104 is also a forest made up of a second group of domains 110. Each domain includes one or more computer-based resources, and maintains a set of user accounts for users who are authorized to access the resources within the domain. For example, as shown in FIG. 1, domain 108($x$) includes client computer resources 112(1)-112($z$). Similarly, domain 110($y$) includes client computer resources 114(1)-114($n$). Because there is mutual trust between domains within a forest, any domain 108(1)-108($x$) can authenticate a user to access any client computer resource associated with any of the domains 108, including clients 112(1)-112($z$). Similarly, any domain 110(1)-110($y$) can authenticate a user to access any client computer resource associated with any of the domains 110, including clients 114(1)-114($n$).

When a user in a first realm requests access to a resource in a second realm, fulfilling the request includes two steps. First, the user's identity is proven to the requested resource. Second, the resource determines whether the user has permission to access the resource as requested. The first step, may be a multi-step process in which the user's identity is proven to one or more domain controllers based on an initial authentication of the user's identity by a domain controller associated with a client device through which the user submits a request.

Trust link 116 between realm 102 and realm 104 represents a mutual trust between the two realms. Based on the trust between realms, a user that is initially authenticated by a domain 108 in realm 102 through any client associated with a domain 108 can be trusted by any domain 110 in realm 104 as being authenticated to any client associated with any domain 110 in realm 104, including clients 114(1)-114($n$), and vice versa.

Selective cross-realm authenticator 106 is implemented to provide an additional level of security by classifying users authenticated in one realm requesting access to a resource in another realm. In one implementation, the cross-realm authenticator 106 associates a security identifier with a user (or with a user request) before the user request reaches the resource that is being requested. A domain controller associated with the requested resource can then grant one level of access to a user authenticated within the same domain as the resource and another level of access to a user authenticated by a domain controller in a different domain.

Domain Controller

Figure 2:
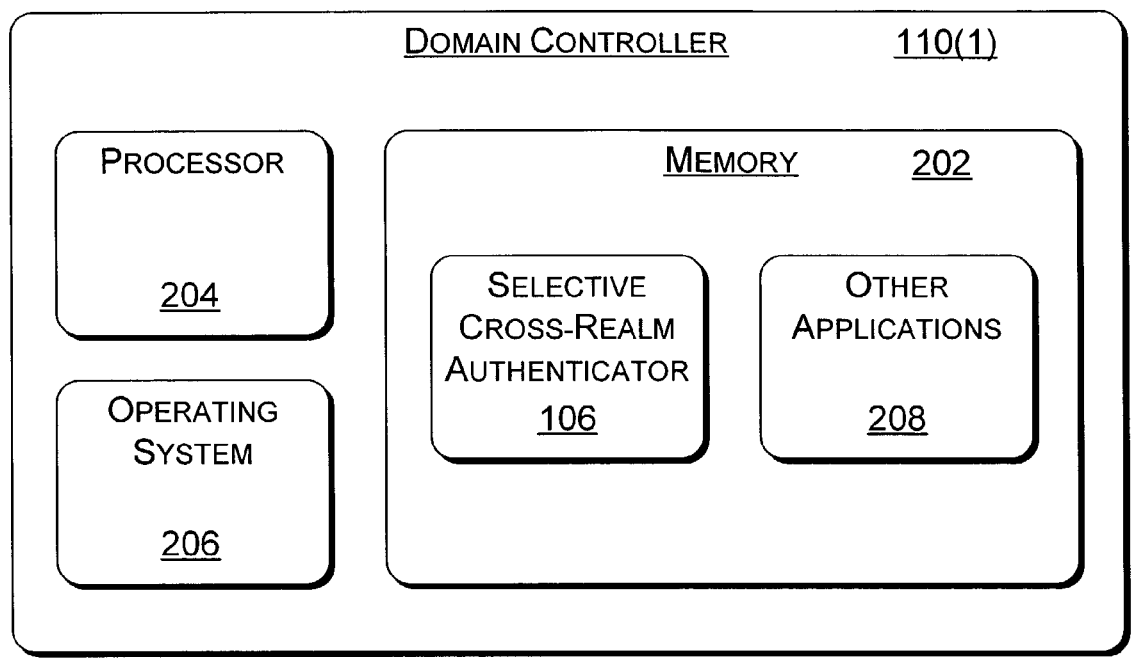
FIG. 2 illustrates selected components of a root domain controller in a realm implemented to support selective cross-realm authentication.

In an exemplary implementation, the root domain controller within a particular realm includes a cross-realm authenticator. FIG. 2 illustrates an exemplary root domain controller implemented to support selective cross-realm authentication. Domain controller 110(1) includes a memory 202 and a processor 204. Domain controller 110(1) also includes an operating system 206 that executes on processor 204 and one or more other applications 208 stored in memory 202 and executed on processor 204. To support selective cross-realm authentication, the domain controller also includes selective cross-realm authenticator 106 stored in memory 202 and executed on processor 204.

Methods for Selective Cross-Realm Authentication

Selective cross-realm authentication may be described in the general context of computer-executable instructions, such as application modules, being executed by a computer. Generally, application modules include routines, programs, objects, components, data structures, etc. that perform particular tasks or implement particular abstract data types. In the described exemplary implementation, selective cross-realm authentication is implemented using methods that may be distributed across multiple components of the environment illustrated in FIG. 1. Selective cross-realm authentication may also be implemented using other types of programming techniques, including in other types of distributed computing environments where tasks are performed by remote processing devices that are linked through various communications networks based on any number of communication protocols. In such a distributed computing environment, application modules may be located in both local and remote computer storage media including memory storage devices.

Figure 3:
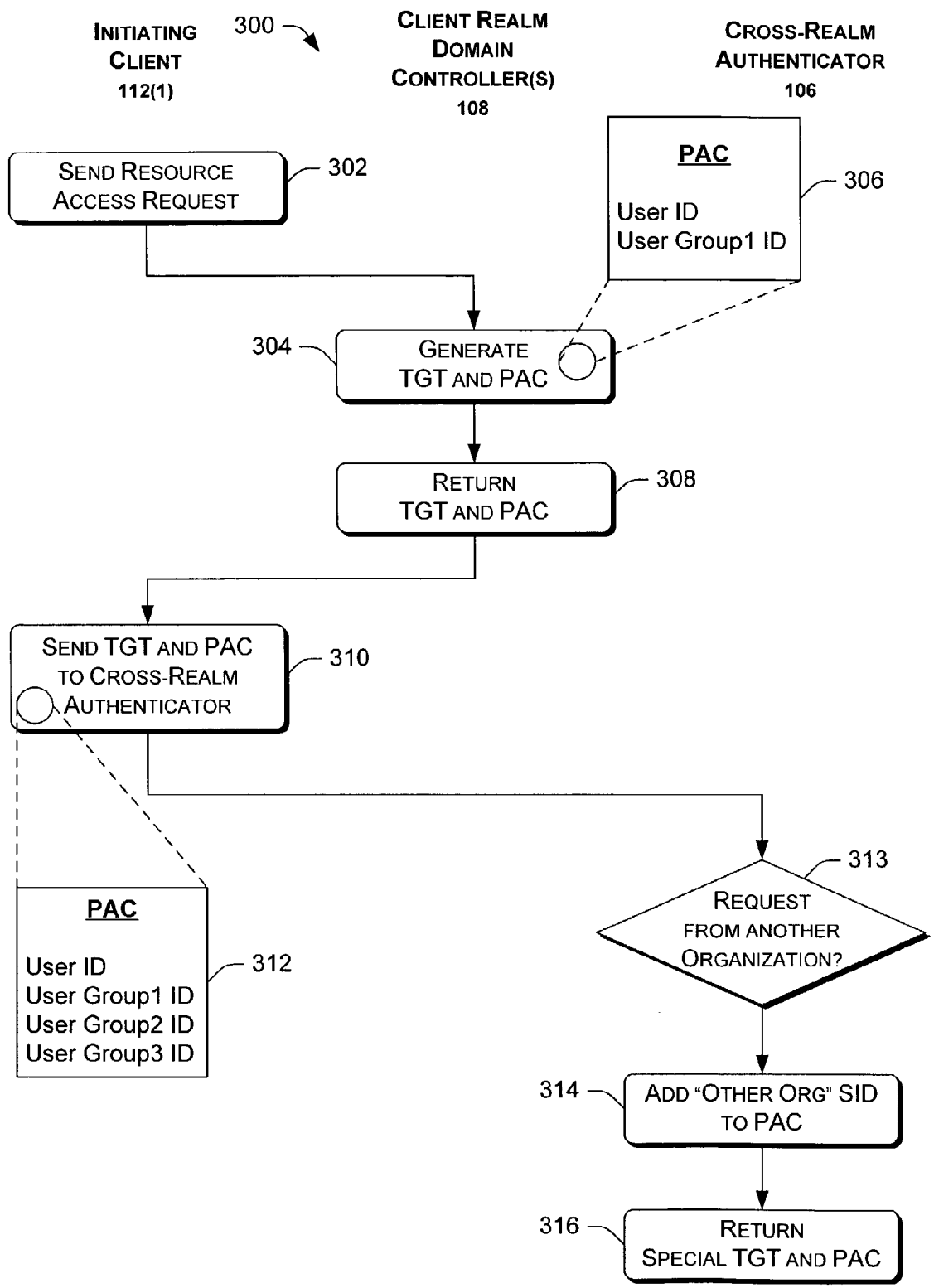
FIG. 3 illustrates a method that can be implemented to support selective cross-realm authentication.

FIG. 3 illustrates a method for a client to obtain an access ticket to a second realm when authenticated by a domain controller in a first realm. The method will be described with reference to a network that is implemented using Kerberos, a well-known network authentication protocol. Although described using Kerberos-specific terminology, it is recognized that selective cross-realm authentication, as described herein, may be implemented in networks that are based on other network authentication protocols. Furthermore, the method illustrated in FIG. 3 will be described, for illustrative purposes, with reference to components shown in FIG. 1.

At block 302, a client computer system 112(1) sends a request to access a resource in another realm to a domain controller 108($x$) associated with the client computer system.

At block 304, a domain controller in domain 108($x$) generates a ticket-granting ticket (TGT) and a privilege access certificate (PAC). The TGT is a Kerberos standard that allows a client to request another ticket to gain access to another domain controller or resource. The PAC includes a list of security identifiers associated with the user. An example PAC 306 is illustrated in FIG. 3 and includes a user ID and a user group ID associated with a user group that the user is a member of.

At block 308, the domain controller 108($x$) returns the TGT and PAC to the client computer system 112(1).

In one implementation, the client computer system 112(1) may submit the request (with the TGT and PAC) to other domains in the same realm, in an effort to find the requested resource. Each domain may add security identifiers to the PAC, depending, for example, on user group memberships that each particular domain controller is aware of.

At block 310, the client computer system 112(1) sends the request with the TGT and PAC 312 to selective cross-realm authenticator 106.

At block 313 selective cross-realm authenticator 106 determines whether the request originated from a realm in another organization. If it is determined that the request did not originate from a realm in another organization (the "No" branch from block 313), then the method continues in block 316. On the other hand, if it is determined that the request did originate from a realm in another organization (the "Yes" branch from block 313), then the method continues in block 314.

At block 314, selective cross-realm authenticator 106 adds an "Other Org" security identifier to the PAC. The "Other Org" security identifier will be used to indicate to the requested resource that the user making the request was authenticated within a realm other than the realm to which the resource belongs.

At block 316, selective cross-realm authenticator 106 returns a special TGT and the updated PAC to client computer system 112(1). The special TGT will allow the client computer system to send the request to a domain controller in realm 104.

Figure 4:
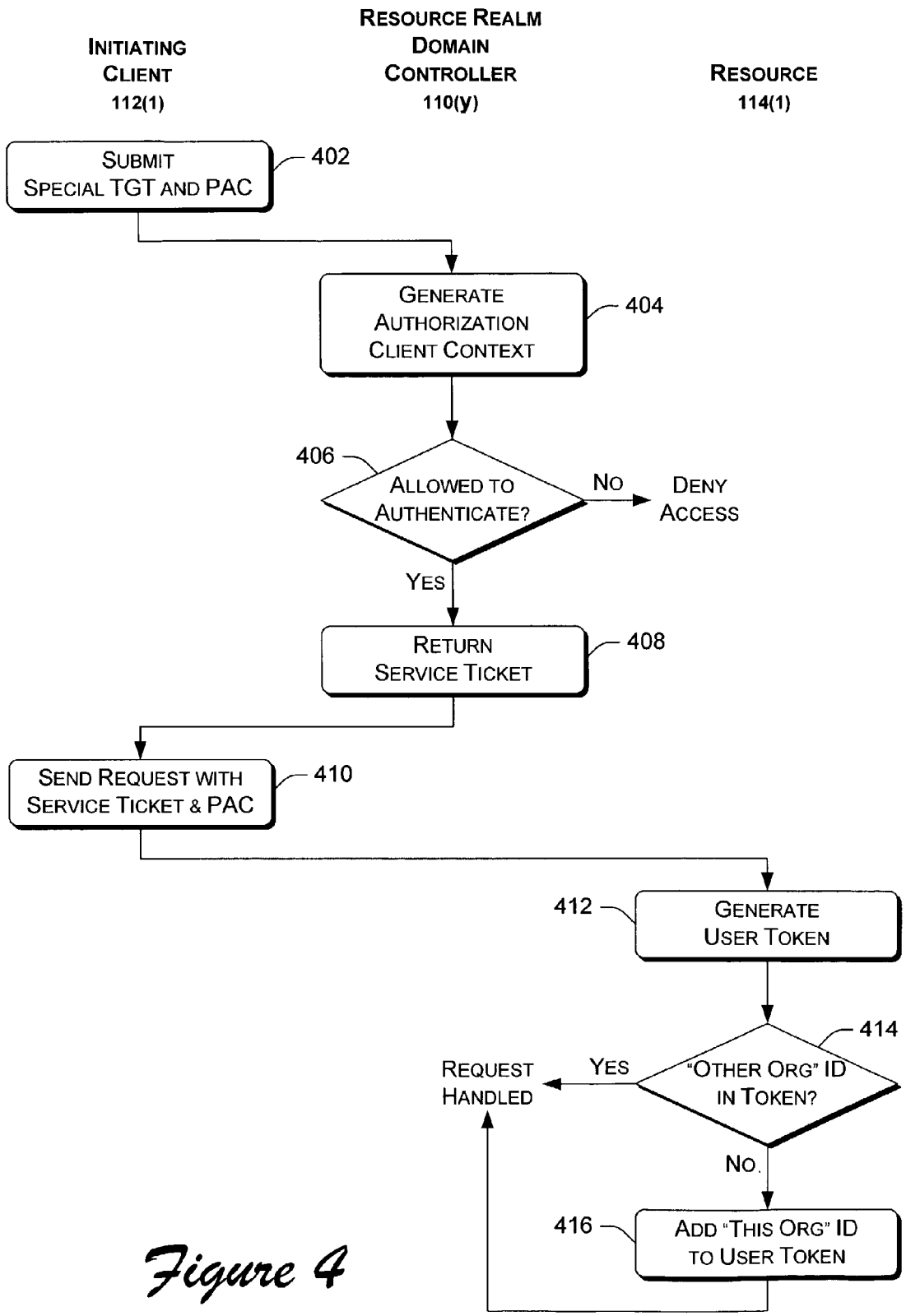
FIG. 4 illustrates a method that can be implemented to support selective cross-realm authentication.

FIG. 4 illustrates a method for domain controllers and resources in a second realm to verify the requesting user's identity based on authentication data associated with the user and/or the request. The method will be described with reference to a network that is implemented using Kerberos, a well-known network authentication protocol. Although described using Kerberos-specific terminology, it is recognized that selective cross-realm authentication, as described herein, may be implemented in networks that are based on other network authentication protocols. While FIG. 3 is described above with reference to client 112(1), domain controllers 108, and cross-realm authenticator 106, FIG. 4 will be described, for illustrative purposes, with reference to client 112(1), domain controller 110(y), and resource 114(1) as shown in FIG. 1.

At block 402, client computer system 112(1) sends the request with the special TGT and PAC (as described with respect to FIG. 3) to a domain controller in domain 110(y) that is associated with the requested resource 114(1). The special TGT tells domain 110(y) that the user has been authenticated and the PAC provides the domain 110(y) with a list of security identifiers that are associated with the user.

At block 404, the domain controller in domain 110(y) generates an authorization client context. The authorization client context is a memory structure that stores representations of the security identifiers that are listed in the PAC.

At block 406, the domain controller in domain 110(y) performs an access check to determine whether or not the user's identity has been proven to the satisfaction of the requested resource. This process is known as authenticating to a resource. The domain controller in domain 110(y) maintains sets of permissions that define which users are allowed to authenticate to which resources 114. For example, resource 114(2) may store business-sensitive data that may be viewed by users who authenticate through a domain server within the same realm 104, but that should not be viewed by users who authenticate through a domain server in another realm. Furthermore, resource 114(n) may store a group of applications that should be available to any authenticated user, regardless of the realm through which they are authenticated. To define these access levels, the domain server 110(y) may store the following user permissions:

| Resource ID | User Security ID | Allowed to Access? |
|---|---|---|
| Client 114 (2) | Authenticated Users | Yes |
| Client 114 (2) | Other Org | No |
| Client 114 (n) | Authenticated Users | Yes |

The first row indicates that all authenticated users are allowed to authenticate to client 114(2). However, the second row indicates that users that are associated with an "Other Org" security identifier are not allowed to authenticate to client 114(2). The third row indicates that all authenticated users are allowed to authenticate to client 114(n). Performing an access check at the domain controller level provides an added level of security in that even if permissions at the resource level are inadvertently set to allow users authenticated in another realm to access the resource, permissions set at the domain controller level can prevent such access because the user will not be allowed to authenticate to the resource.

When the domain controller in domain 110(y) performs an access check, the authorization client context (which stores a representation of the security identifiers associated with a user) is compared to the permissions that are defined for the requested resource. In the described implementation, if any of the permissions indicate that the user should not be allowed to authenticate to the resource, then the user is denied access to the requested resource (the "No" branch from block 406).

At block 408, when it is determined that the user is allowed to authenticate to the requested resource (the "Yes" branch from block 406), the domain controller 110(y) returns a service ticket to the client computer system 112(1). The service ticket contains information that, when presented to the resource, indicates that the user is properly authenticated to the resource.

At block 410, the client computer system 112(1) sends the request with the service ticket and PAC to the requested resource 114(1).

At block 412, the requested resource 114(1) generates a user token. The user token is similar to the authorization client context described above with reference to block 404, in that the user token is also a memory structure that stores a representation of the security identifiers that are associated with the user, based on the contents of the PAC.

At block 414, the resource 114(1) examines the user token to determine whether or not the user is associated with the "Other Org" security identifier, which indicates that the user was authenticated by a domain controller associated with a realm in another organization 104. If the user token does include the "Other Org" security identifier, then the request is handled (the "Yes" branch from block 414).

At block 416, when it is determined that the user token does not include the "Other Org" security identifier (the "No" branch from block 414), then prior to handling the request, the resource 114(1) adds a "This Org" security identifier to the user token to indicate that the user was authenticated by a domain controller in realm 204.

Given the described implementation, client computer system (e.g., clients 112 and 114) can maintain permissions at an object level that are associated with the "This Org" and "Other Org" security identifiers. For example, in a particular client computer system, permissions may be defined that provide full access to a particular directory to users associated with the "This Org" identifier and read-only access to users associated with the "Other Org" identifier. In this way, system administrators of the client computer systems can prevent users authenticated in another realm from accessing sensitive data that should only be available to users who can authenticate from within the same realm.

CONCLUSION

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:

receiving, from a user authenticated in a first realm, a request to access a resource associated with a second realm; and associating the user with a security identifier included in a token, the security identifier indicates that the user was authenticated in a realm other than the second realm, such that resources within the second realm can make authentication and access control decisions based on the security identifier;

wherein:

resources within the first realm have a mutual trust relationship with other resources within the first realm, such that if a first realm user has permission to access a particular resource within the first realm, the first realm user is granted access to the resource within the first realm when the first realm user is authenticated by any entity within the first realm;

resources within the second realm have a mutual trust relationship with other resources within the second realm, such that if a second realm user has permission to access a particular resource within the second realm, the second realm user is granted access to the resource within the second realm when the second realm user is authenticated by any entity within the second realm; and the first and second realms have a selective trust relationship such that:

the second realm user authenticated within the second realm is granted access to a resource in the second realm with a set of permissions for users authenticated within the second realm; and a first realm user authenticated within the first realm is granted access to the resource in the second realm with a set of permissions for users authenticated outside of the second realm, wherein the set of permissions for users authenticated outside of the second realm is more restrictive than the set of permissions for users authenticated within the second realm.

2. The method as recited in claim 1 wherein the user comprises an application.

3. The method as recited in claim 1 wherein the user comprises a computer system.

4. The method as recited in claim 1 wherein the identifier further indicates a type of authentication associated with the user.

5. The method as recited in claim 4 wherein the token comprises a privilege access certificate.

6. The method as recited in claim 1 wherein the associating comprises setting a flag.

* * * * *